Nov. 10, 1925.
W. F. REACH
HURDLE
Filed July 8, 1925
1,561,186
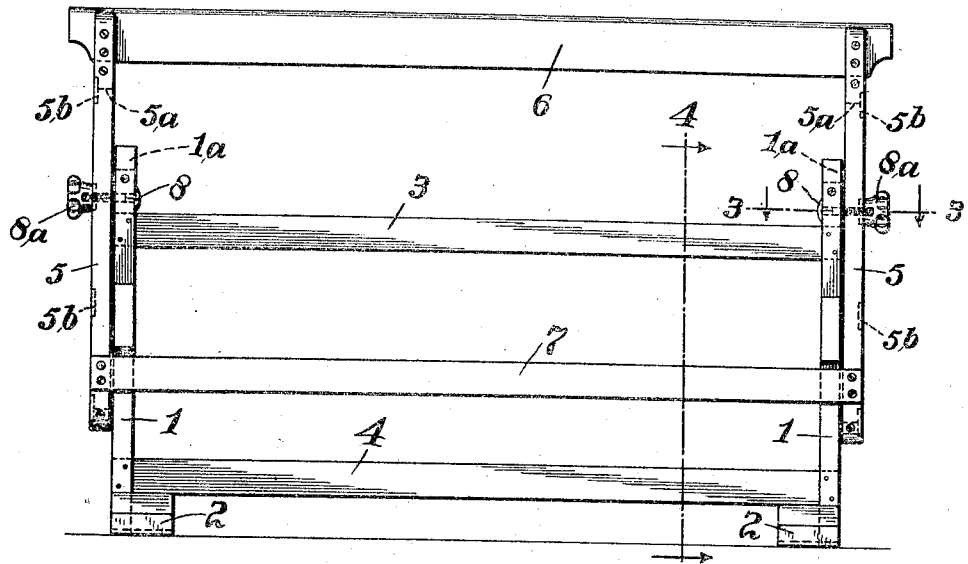
Fig.1.
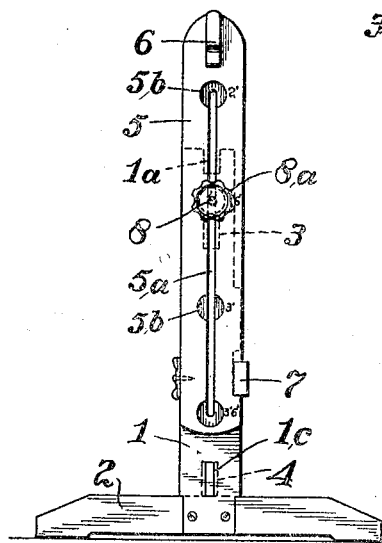
Fig.2.
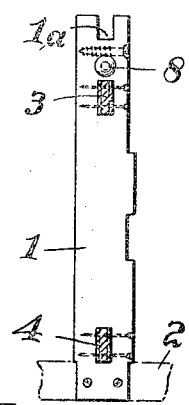
Fig.3.
Fig.4.
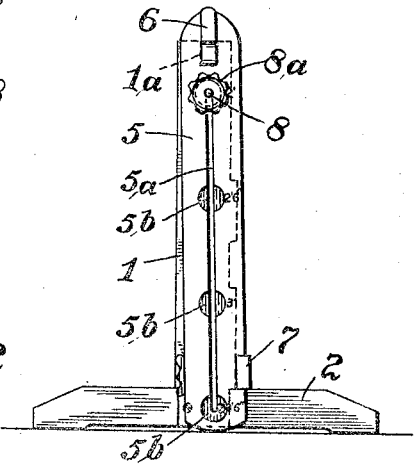
Fig.5.
Inventor:
William F. Reach,
Attys.

Patented Nov. 10, 1925.

1,561,186

UNITED STATES PATENT OFFICE.

WILLIAM F. REACH, OF SPRINGFIELD, MASSACHUSETTS, ASSIGNOR TO A. G. SPALDING & BROS., OF NEW YORK, N. Y., A CORPORATION OF NEW JERSEY.

HURDLE.

Application filed July 8, 1925. Serial No. 42,258.

*To all whom it may concern:*

Be it known that I, WILLIAM F. REACH, a citizen of the United States, and resident of Springfield, in the county of Hampden and State of Massachusetts, have invented certain new and useful Improvements in Hurdles, of which the following is a specification.

My present invention relates to improvements in hurdles of the type disclosed in Letters Patent of the United States granted to me on the 22nd day of December, 1914, No. 1,122,158.

The invention aims to provide a hurdle which will have an extreme range of adjustment relative to height of standards, and which may be adjusted to at least four definite elevations, and which in all positions but its lowermost will be locked against movement in one direction.

The invention further aims to provide, in such a hurdle, an improved form of adjustable pivot arrangement by which the hurdle may be readily adjusted vertically and securely retained in its adjusted position without interfering with its free pivotal movement.

With these several objects in view the invention includes the novel features of construction and arrangement and combination of parts hereinafter described and defined by the appended claims.

An embodiment of the invention is illustrated in the accompanying drawings, in which:—

Figure 1 is side elevation of the hurdle.

Fig. 2 is an end view.

Fig. 3 is a section on line 3—3 of Fig. 1, and

Fig. 4 is a section on line 4—4 of Fig. 1.

Fig. 5 is a view similar to Fig. 2 with the parts adjusted to lowest position.

Referring by reference characters to this drawing, the numerals 1, 1, designate a pair of supporting standards carried by suitable base pieces 2, 2, and connected by cross bars 3 and 4. Juxtaposed against the outer faces of these standards are a pair of uprights 5 which are connected by the top and bottom cross bars 6 and 7, the uprights and cross bars constituting a frame which is pivotally connected to the standards so as to be vertically adjustable relative thereto, the lower cross bar 7 being connected to the edges of the uprights so that when the frame is in vertical position the said lower cross bar abuts against the corresponding edges of the standards and serves as a stop to prevent swinging of the frame in one direction.

My preferred form of adjustable pivotal connection is as follows:—

The uprights 5 are provided with centrally arranged vertical slots $5^a$ which extend throughout the desired range of adjustment and are engaged by pivot bolts 8 fixedly carried by the standards near the upper ends thereof. Each upright 5 is provided at suitable intervals in its outer or exposed face, with a plurality of circular recesses $5^b$ arranged say at 2', 2' 6'', 3' and 3' 6'' adjustments, which circular recesses are bisected by the slots of the respective uprights.

Located on each pivot pin is a retaining or locking member in the shape of a knob $8^a$ movably held on the pivot pin and having a circular part adapted to engage any one of the recesses of the corresponding upright. Preferably the pivot pins are screw threaded and the knob members provided with corresponding screw threaded bores.

By unscrewing the knobs their inner ends may be withdrawn from the recesses whereupon the uprights may be readily adjusted to the desired height. On again screwing the knobs into engagement with the recesses, the frame will be held at the proper elevation, but free swinging movement will not be interfered with if the knobs are not screwed up too tightly.

As will be observed, the slots extend very close to the bottoms of the uprights and to enable the bottom cross bar of the frame to act as a stop when the frame is adjusted to its extreme elevation, I locate the said cross bar above the bottom of the slot, the upper ends of the standards being extended a corresponding distance above the pivot pins.

The top cross bar is preferably arranged centrally of the uprights and to allow for extreme low adjustment the upper ends of the standards are provided with recesses $1^a$ to receive the top cross bar. This permits the adjusting of the frame to the lowest point, the two foot height, while at the same time the portions of the standards which project above the bottoms of the slots coact with the lower frame cross bar to act as a one way stop.

Of course when the top cross bar rests in the slots, the frame is held against pivotal movement, but such movement is not necessary at the 2 foot adjustment.

Preferably the standards and uprights are made of the same width, the lower cross bar is set in mortises or recesses in the edges of the uprights, and the lower edges of the standards are provided with cross bar receiving cut away portions, as indicated at 1ᶜ.

Having thus described my invention what I claim is:—

1. A hurdle comprising a pair of supporting standards and a frame comprising uprights and connecting top and bottom cross bars, said uprights being juxtaposed to the outer faces of the standards and having vertical slots, pivot pins carried by the standards near their upper ends and engaging the slots, means for holding the uprights at any one of a plurality of predetermined elevations relative to said pivots, the bottom cross bar being connected to the edges of the uprights on one side thereof, and overlapping the corresponding edges of the standards.

2. A hurdle comprising a pair of supporting standards and a frame comprising uprights and connecting top and bottom cross bars, said uprights being juxtaposed to the outer faces of the standards and having vertical slots, pivot pins carried by the standards near their upper ends and engaging the slots, means for holding the uprights at any one of a plurality of predetermined elevations relative to said pivots, the bottom cross bar being connected to the edges of the uprights on one side thereof, and overlapping the corresponding edges of the standards, said bottom cross bar being located above the bottoms of the slots.

3. The hurdle of claim 2, in which the top cross bar is located in line with the slots and the upper ends of the standards are provided with recesses to receive the said top cross bar.

4. A hurdle comprising supporting standards, and a frame including uprights and cross bars, said uprights being juxtaposed to said standards and having vertical slots, pivot pins carried by the standards and passing through said slots, each of said uprights having in its exposed face a plurality of circular recesses bisected by said slots, and movable locking devices carried by said pivot pins having circular parts to cooperate with said recesses.

In testimony whereof I affix my signature.

WILLIAM F. REACH.